United States Patent
Kernan

(10) Patent No.: US 7,457,869 B2
(45) Date of Patent: Nov. 25, 2008

(54) SYSTEM AND METHOD FOR MONITORING MANAGEMENT

(75) Inventor: Timothy S. Kernan, Milton, MA (US)

(73) Assignee: SiteWatch Technologies, LLC, Milton, MA (US)

( * ) Notice: Subject to any disclaimer, the term of this patent is extended or adjusted under 35 U.S.C. 154(b) by 1148 days.

(21) Appl. No.: 10/819,090

(22) Filed: Apr. 6, 2004

(65) Prior Publication Data

US 2005/0225441 A1    Oct. 13, 2005

(51) Int. Cl.
*G06F 15/173* (2006.01)
(52) U.S. Cl. ............... 709/224; 709/223; 709/203; 340/506
(58) Field of Classification Search ............ 709/223, 709/224, 246, 203, 217–219; 340/506
See application file for complete search history.

(56) References Cited

U.S. PATENT DOCUMENTS

| | | | |
|---|---|---|---|
| 5,361,216 A | 11/1994 | Warn et al. | |
| 5,400,246 A | 3/1995 | Wilson et al. | |
| 5,400,253 A | 3/1995 | O'Connor | |
| 5,423,457 A | 6/1995 | Nicholas et al. | |
| 5,546,301 A | 8/1996 | Agrawal et al. | |
| 5,596,501 A | 1/1997 | Comer et al. | |
| 5,612,890 A | 3/1997 | Strasser et al. | |
| 5,673,252 A | 9/1997 | Johnson et al. | |
| 5,757,664 A | 5/1998 | Rogers et al. | |
| 5,956,487 A | 9/1999 | Venkatraman et al. | |
| 5,973,696 A | 10/1999 | Agranat et al. | |
| 5,982,362 A | 11/1999 | Crater et al. | |
| 6,067,549 A | 5/2000 | Smalley et al. | |
| 6,115,654 A | 9/2000 | Eid et al. | |
| 6,119,125 A | 9/2000 | Gloudeman et al. | |
| 6,124,806 A | 9/2000 | Cunningham et al. | |

(Continued)

OTHER PUBLICATIONS

Salemi, T., "Keeping and eye on the underground," *Boston Business Journal*, 17(46):(1998).
Environmental Management Technologies, Inc., "Qualification Statement," (1998).

*Primary Examiner*—Philip B Tran
(74) *Attorney, Agent, or Firm*—Hamilton Brook Smith Reynolds, P.C.

(57) ABSTRACT

A system and a method for automating the management, reporting and tracking of compliance of monitored systems provides for collecting data specific to the compliance requirements of a monitored system, monitoring the periodic status of compliance, managing manually provided compliance requirements and reporting on compliance status whereby a multi-facility, multi-system compliance manager can manage compliance and a single facility, single system user can manage site or system-specific compliance. A monitoring management system comprises a plurality of devices, a gateway server and a host. Each device provides monitoring data associated with monitoring of a corresponding resource, the monitoring data for each particular device represented in a data format specific to that device. The gateway server includes a plurality of device ports, each device port connected to a corresponding device for receiving the monitoring data, a processor that processes the received data into a common format from the device-specific formats, and a communication port for communicating the processed data. The host is connected to the gateway server communication port over a communications network and has a receiver for receiving the communicated data, a parser for parsing the received data, and an auditor for auditing the parsed data.

31 Claims, 12 Drawing Sheets

U.S. PATENT DOCUMENTS

| | | |
|---|---|---|
| 6,292,099 B1 | 9/2001 | Tse et al. |
| 6,292,909 B1 * | 9/2001 | Hare ........................... 714/40 |
| 6,341,287 B1 | 1/2002 | Sziklai et al. |
| 6,437,692 B1 | 8/2002 | Petite et al. |
| 6,505,086 B1 | 1/2003 | Dodd, Jr. et al. |
| 6,516,326 B1 | 2/2003 | Goodrich et al. |
| 6,535,690 B2 | 3/2003 | Tanabe |
| 6,542,075 B2 * | 4/2003 | Barker et al. ................ 340/506 |
| 6,557,009 B1 | 4/2003 | Singer et al. |
| 6,577,988 B1 | 6/2003 | Travagline et al. |
| 6,598,464 B1 | 7/2003 | Rossi |
| 6,615,088 B1 | 9/2003 | Myer et al. |
| 6,631,298 B1 | 10/2003 | Pagnano et al. |
| 6,642,843 B2 | 11/2003 | Satoh |
| 6,646,564 B1 | 11/2003 | Azieres et al. |
| 6,829,478 B1 * | 12/2004 | Layton et al. ............... 455/428 |
| 6,961,765 B2 * | 11/2005 | Terry .......................... 709/224 |
| 7,002,462 B2 * | 2/2006 | Welch ........................ 340/506 |
| 7,072,931 B2 * | 7/2006 | Goldhaber et al. .......... 709/201 |
| 7,289,988 B2 * | 10/2007 | Joseph .......................... 707/6 |
| 2002/0059410 A1 * | 5/2002 | Hara et al. .................. 709/223 |
| 2003/0028544 A1 | 2/2003 | Virag et al. |
| 2003/0069894 A1 | 4/2003 | Cotter et al. |
| 2003/0115198 A1 | 6/2003 | Singer et al. |
| 2003/0131011 A1 * | 7/2003 | Haunschild et al. ......... 707/100 |
| 2005/0071457 A1 * | 3/2005 | Yang-Huffman et al. .... 709/224 |

* cited by examiner

FIG. 12

Admin | Options | Help |
SiteWatch

Modules
- Main
- Systems
- Directory

☐ Print | Export to PDF                                    Reports: UST Summary

Period: January                                            Tank:    02- Unleaded Inventory Company UST Modules
- Compliance Rpts
- Profile Rpts
- Accounting Rpts
- Dispatch Rpts Location UST Modules
- Location Main
- Reports
  - UST Summary
  - Inventory
  - Alarms
  - Delivery
  - Book Balance
  - Leak Test
  - Totalizer
  - Compliance Schedule
- MECRP
- Toolbox

| Date | Time | Tank | Level | Gross Gallons | Temp | Net Gallons | Ullage | Water Height | Water Gallons |
|---|---|---|---|---|---|---|---|---|---|
| Jan-01 | 00:56 | 02 | 53.21 | 4580.00 | 41.70 | 4638.00 | 3470.00 | 0.00 | 0.00 |
| Jan-02 | 00:56 | 02 | 40.02 | 3177.00 | 42.27 | 3216.00 | 4873.00 | 0.00 | 0.00 |
| Jan-03 | 00:56 | 02 | 19.79 | 1197.00 | 42.80 | 1211.00 | 6853.00 | 0.00 | 0.00 |
| Jan-04 | 00:56 | 02 | 56.75 | 4954.00 | 43.79 | 5010.00 | 3096.00 | 0.00 | 0.00 |
| Jan-05 | 00:56 | 02 | 29.69 | 2118.00 | 43.77 | 2142.00 | 5932.00 | 0.00 | 0.00 |
| Jan-06 | 00:56 | 02 | 66.71 | 5971.00 | 37.20 | 6066.00 | 2079.00 | 0.00 | 0.00 |
| Jan-07 | 00:56 | 02 | 43.37 | 3531.00 | 39.11 | 3582.00 | 4519.00 | 0.00 | 0.00 |
| Jan-08 | 00:56 | 02 | 22.28 | 1417.00 | 40.49 | 1436.00 | 6633.00 | 0.00 | 0.00 |
| Jan-09 | 00:56 | 02 | 69.55 | 6246.00 | 39.14 | 6337.00 | 1804.00 | 0.00 | 0.00 |
| Jan-10 | 00:56 | 02 | 46.54 | 3869.00 | 39.93 | 3923.00 | 4181.00 | 0.00 | 0.00 |
| Jan-11 | 00:56 | 02 | 15.57 | 848.00 | 40.85 | 858.00 | 7202.00 | 0.00 | 0.00 |
| Jan-12 | 00:56 | 02 | 61.08 | 5404.00 | 43.54 | 5466.00 | 2646.00 | 0.00 | 0.00 |
| Jan-13 | 00:56 | 02 | 26.64 | 1822.00 | 43.20 | 1843.00 | 6228.00 | 0.00 | 0.00 |
| Jan-14 | 00:55 | 02 | 53.15 | 4574.00 | 36.03 | 4650.00 | 3476.00 | 0.00 | 0.00 |
| Jan-15 | 00:55 | 02 | 26.43 | 1802.00 | 38.37 | 1828.00 | 6248.00 | 0.00 | 0.00 |
| Jan-16 | 00:55 | 02 | 62.89 | 5588.00 | 37.45 | 5676.00 | 2462.00 | 0.00 | 0.00 |
| Jan-17 | 00:55 | 02 | 33.67 | 2518.00 | 38.57 | 2555.00 | 5532.00 | 0.00 | 0.00 |
| Jan-18 | 00:55 | 02 | 70.27 | 6314.00 | 46.97 | 6371.00 | 1736.00 | 0.00 | 0.00 |
| Jan-19 | 00:55 | 02 | 32.91 | 2440.00 | 45.50 | 2465.00 | 5610.00 | 0.00 | 0.00 |
| Jan-20 | 00:55 | 02 | 58.72 | 5160.00 | 39.95 | 5232.00 | 2890.00 | 0.00 | 0.00 |
| Jan-21 | 00:55 | 02 | 30.94 | 2243.00 | 41.04 | 2272.00 | 5807.00 | 0.00 | 0.00 |
| Jan-22 | 00:55 | 02 | 69.46 | 6238.00 | 35.70 | 6343.00 | 1812.00 | 0.00 | 0.00 |
| Jan-23 | 00:55 | 02 | 32.56 | 2406.00 | 37.65 | 2443.00 | 5644.00 | 0.00 | 0.00 |
| Jan-24 | 00:55 | 02 | 81.84 | 7311.00 | 33.92 | 7444.00 | 739.00 | 0.00 | 0.00 |
| Jan-25 | 00:55 | 02 | 47.50 | 3971.00 | 35.95 | 4038.00 | 4079.00 | 0.00 | 0.00 |
| Jan-26 | 00:55 | 02 | 11.28 | 531.00 | 37.65 | 538.00 | 7519.00 | 0.00 | 0.00 |
| Jan-27 | 00:55 | 02 | 37.24 | 2886.00 | 34.90 | 2936.00 | 5164.00 | 0.00 | 0.00 |
| Jan-28 | 00:55 | 02 | 56.07 | 4883.00 | 37.45 | 4959.00 | 3167.00 | 0.00 | 0.00 |
| Jan-29 | 00:54 | 02 | 23.55 | 1533.00 | 38.23 | 1555.00 | 6517.00 | 0.00 | 0.00 |

SYSTEM AND METHOD FOR MONITORING MANAGEMENT

BACKGROUND

In the field of environmental compliance, control and monitoring devices are used to provide valuable information for monitoring and managing elements of a monitored system or facility. For example, an underground remediation system may be installed to control the remediation process of contaminated subsurface grounds and may provide a capability for monitoring the status of the activity. In another example, an underground storage tank monitor may be installed with an underground storage tank system to monitor the tanks, related pipes and surrounding subsurface grounds.

Managers responsible for such systems or facilities generally have a need to track the operating status of the system. This may often include the need to manage regulatory compliance requirements associated with the installed system or the surrounding environment.

These control and monitoring devices, referred to by the term "third party devices" (TPDs), can be any controller, microcontroller, embedded computer, embedded processor or other such electronic device, instrument or sensor which controls, monitors or otherwise provides information about some other element.

Because such devices are typically isolated and independent devices, it has been difficult to integrate them with information management systems. In particular, there are several problems with integrating multiple third party devices at one or more geographical location into a common information management system:

For example, each TPD typically uses a different line level protocol. That is, each device may employ a different electrical signaling technology for transmitting data, including but not limited to RS232, RS485/422, FireWire, Current Loop, Ethernet, 4-20 ma and proprietary protocols.

Each TPD may use different command and data structures. In particular, each device may have a different command syntax for interaction with the device, format its output data differently and use different methods to represent data. Some devices transmit printable characters; some transmit non-printable characters.

Each TPD may use a separate user interface. Typically, each device has its own communications port, making it difficult for a user to communicate with each device without installing separate dedicated phone lines or other multiport communications devices. Because these devices may not be network ready, networking technologies can not be used. This independence complicates remote TPD control and management.

Device independent applications (software programs) typically do not exist. Common software applications which accept information from similar TPDs regardless of the manufacturer do not exist or are not common.

For software application suites to effectively manage operational parameters of TPDs, and specifically environmental compliance, state, local and federal regulations must be formatted or codified for use by software.

A known system provides for up to two TPDs that are connected to a microcontroller for the purpose of collecting data from the devices. In this known system, data is polled via a telephone dial up connection by a personal computer. Once the data is received and stored at the PC, a parser places the data into databases from which reports are printed. Limited rules applied to the data for determining compliance are hard coded and limited to one rule per system resource.

SUMMARY

There is a need for a flexible and robust approach to managing, reporting and tracking compliance to regulations or other parameters of operation for monitored systems.

The present invention relates to a system and a method for automating the management, reporting and tracking of compliance of monitored systems. The present approach provides applications, reports, databases and analytical tools useful in managing multiple systems from multiple vendors installed in dispersed locations. The present approach provides a cost effective solution with independence from third party device manufacturers and with centralized data management.

Embodiments in accordance with the principles of the invention may provide for collecting data specific to the compliance requirements of a monitored system, monitoring the periodic status of compliance, managing manually provided compliance requirements and reporting on compliance status whereby a multi-facility, multi-system compliance manager can manage compliance and a single facility, single system user can manage site or system-specific compliance.

Accordingly, a monitoring management system comprises a plurality of devices, a gateway server and a host. Each device provides monitoring data associated with monitoring of a corresponding resource, the monitoring data for each particular device represented in a data format specific to that device. The gateway server includes a plurality of device ports, each device port connected to a corresponding device for receiving the monitoring data, a processor that processes the received data into a common format from the device-specific formats, and a communication port for communicating the processed data. The host is connected to the gateway server communication port over a communications network and has a receiver for receiving the communicated data, a parser for parsing the received data, and an auditor for auditing the parsed data.

In an embodiment, the common format defines a data record structure that includes a device identifier field for identifying the specific device, a task identifier field for identifying a task from which the record originated, and a native data field for carrying the monitoring data. The processed monitoring data in the common format comprises plural data records that is communicated to the host as data file.

The parsing of the received data at the host is based on the device identifier field and native data identifiers contained within the native data field.

The host further includes one or more exception tables that define rules for testing for out of limit conditions associated with monitored resources. The auditor provides auditing by evaluating the parsed data based on one or more rules defined by one or more entries of the exception tables to provide one or more exception reports based on an outcome of the audit. The one or more exception reports are any of a type that includes daily, periodic and manual compliance reports. The exception tables can be based on regulations of a type that includes local, county, state, federal and other regulatory entities or based on non-regulatory rules of a type that includes corporate policy and industry standards.

The monitoring data may include alarm data that the auditor audits to provide one or more exception reports.

The gateway server further includes plural device-specific software modules, each module associated with a corresponding device port for handling processing of data through the device port. The gateway server processor is adapted to identify the type of device port and load the corresponding device-specific software module into a processor memory.

In an embodiment, the monitoring management system may further include a data source that communicates other monitoring data in the common format to the host to be parsed and audited based on the exception tables.

The monitoring management system further includes a user interface application connected to the host that provides access to audited data. The devices can be associated with monitoring multiple systems at multiple locations, with the user interface application providing access to data from multiple systems and multiple locations.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 12 is a screen view of a third sample view from the user interface.

DETAILED DESCRIPTION

Figure 1:
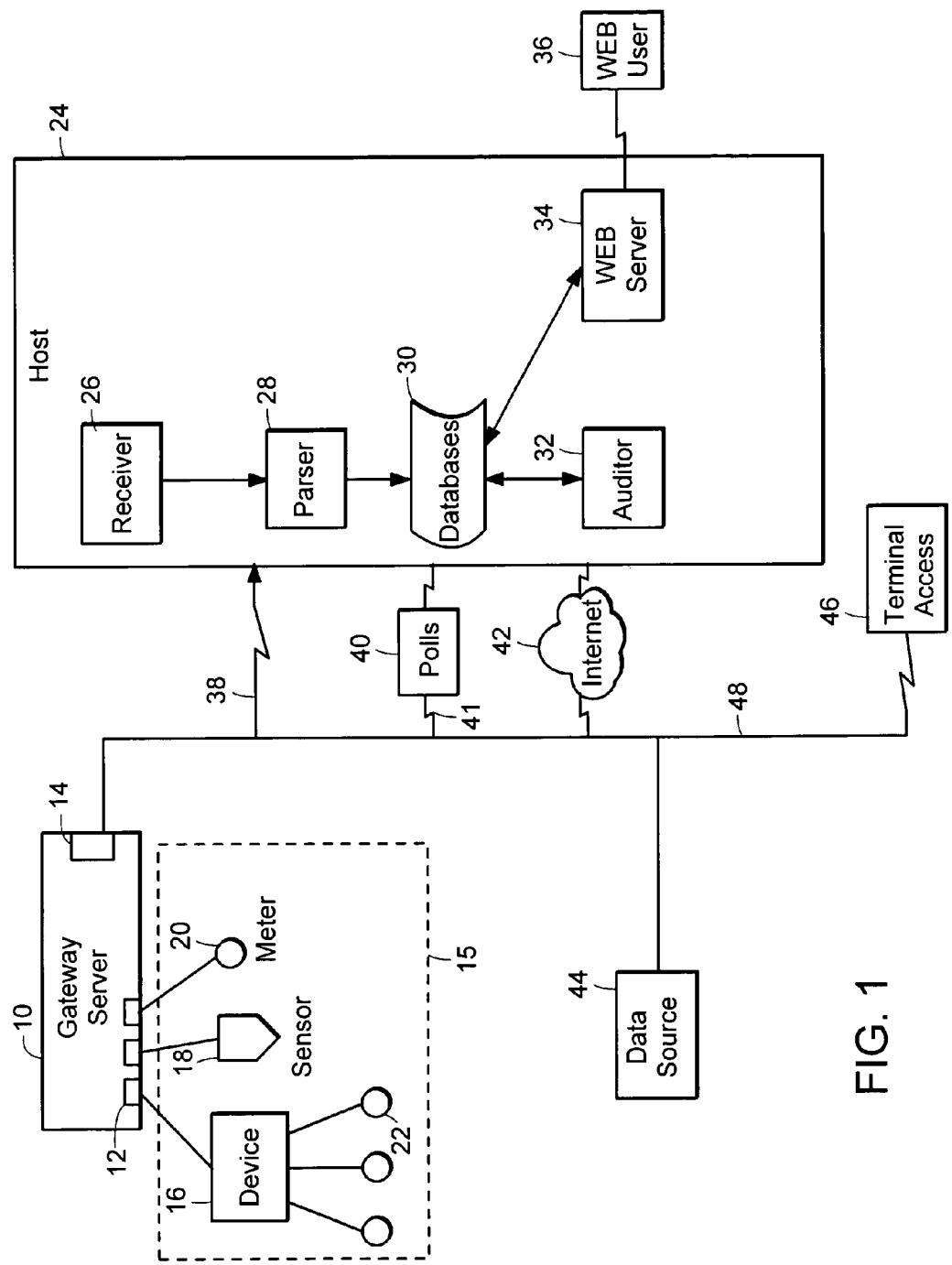
FIG. 1 is a block diagram of a monitoring arrangement in accordance with the principles of the present invention.

An embodiment of an arrangement based on the principles of the present invention is illustrated in FIG. 1. The arrangement includes a gateway server 10 connected to devices 15 and to a host 24 over a communications network 48.

The multiple devices 15 connected to gateway server 10 generally comprise "third party devices" (TPDs) that collect and transmit monitoring data. The TPDs can include, as shown in the example embodiment, a tank gauge device 16 connected to sensors and/or probes 22, directly connected sensors 18 and meters 20, or other suitable devices for monitoring resources. The TPDs connect to I/O ports 12 on the gateway server 10 via protocols that are specific to the TPD, including but not limited to RS232, RS485/422, FireWire, Current Loop, Ethernet, 4-20 ma and proprietary protocols. Communications port 14 provides for communications to and from the host 24.

The host 24 includes receiver 26, parser 28, databases 30, auditor 32 and web server application 34. The functions of these elements of the host 24 are described further herein.

A data source 44 is shown connected to the host 24 over communications network 48. As described further herein, the data source 44 can provide other monitoring data that has been formatted in a common format that the host 24 can receive and process.

Generally, gateway server 10 and data source 44, collectively referred to herein as subscriber systems, can be located in a building, out-building, shed, garage, pump station, lift station or other structure from which data is to be collected. It should be understood that other arrangements may include multiple gateway servers 10 and data sources 44 at multiple locations.

The monitored resources can include elements of any system that can be monitored, such as the elements of an underground storage system that includes tanks, pipes and subsurface grounds. The principles of the present approach as described herein can be applied to other monitored systems that include but are not limited to the following: air quality (indoor and outdoor) systems, automatic tank gauge systems, boiler control and monitoring systems, card access and control systems, energy management systems, fuel management systems, gasoline dispensing systems, generator systems (emergency backup), HVAC systems, industrial process monitors, kitchen equipment, point of sale systems, refrigeration and cooler systems, security systems, time clocks, vapor monitoring systems, vending machines, wastewater treatment systems, water quality treatment and monitoring systems, asset tracking and vehicle tracking systems.

A remote user can access the gateway server 10 or data source 44 via a terminal 46 over network 48 which either supports a web browser or commonly available terminal emulation or communications software.

The communications network 48 can include any communications network portions including local area network, wide area network, public switched telephone network, internet, or wireless network. For example, as shown in the arrangement of FIG. 1, connection 38 is a standard phone line and connection 42 is an internet connection. The host 24 may also employ a poller 40 for polling the gateway server 10 and/or the data source 44 over a connection 41 to the network 48.

Figure 2:
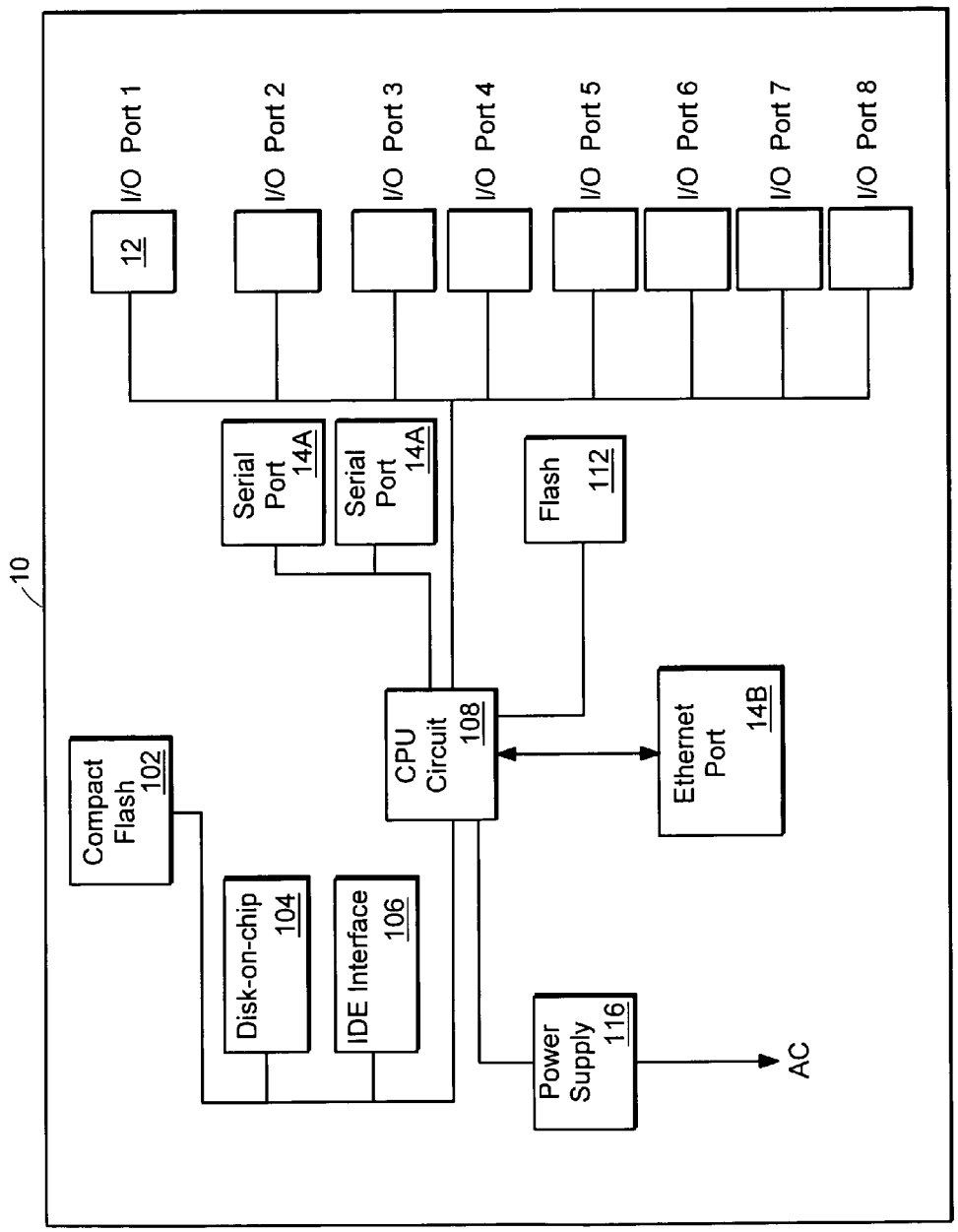
FIG. 2 is a block diagram of the gateway server of FIG. 1.

FIG. 2 illustrates an embodiment of the gateway server 10 (FIG. 1) that includes a central processing unit (CPU) 108 electrically integrated with typical peripheral hardware including compact flash 102, disk-on-chip 104, IDE interface 106, serial ports 14A, Ethernet port 14B, flash 112, power supply 116 and eight I/O ports 12. Configuration parameters determine which of the compact flash 102, disk-on-chip 104 or IDE interface 106 is active on a specific server 10. Selection of one configuration over another is ruled in part by availability and requirements of the specific implementation of software.

Figure 3:
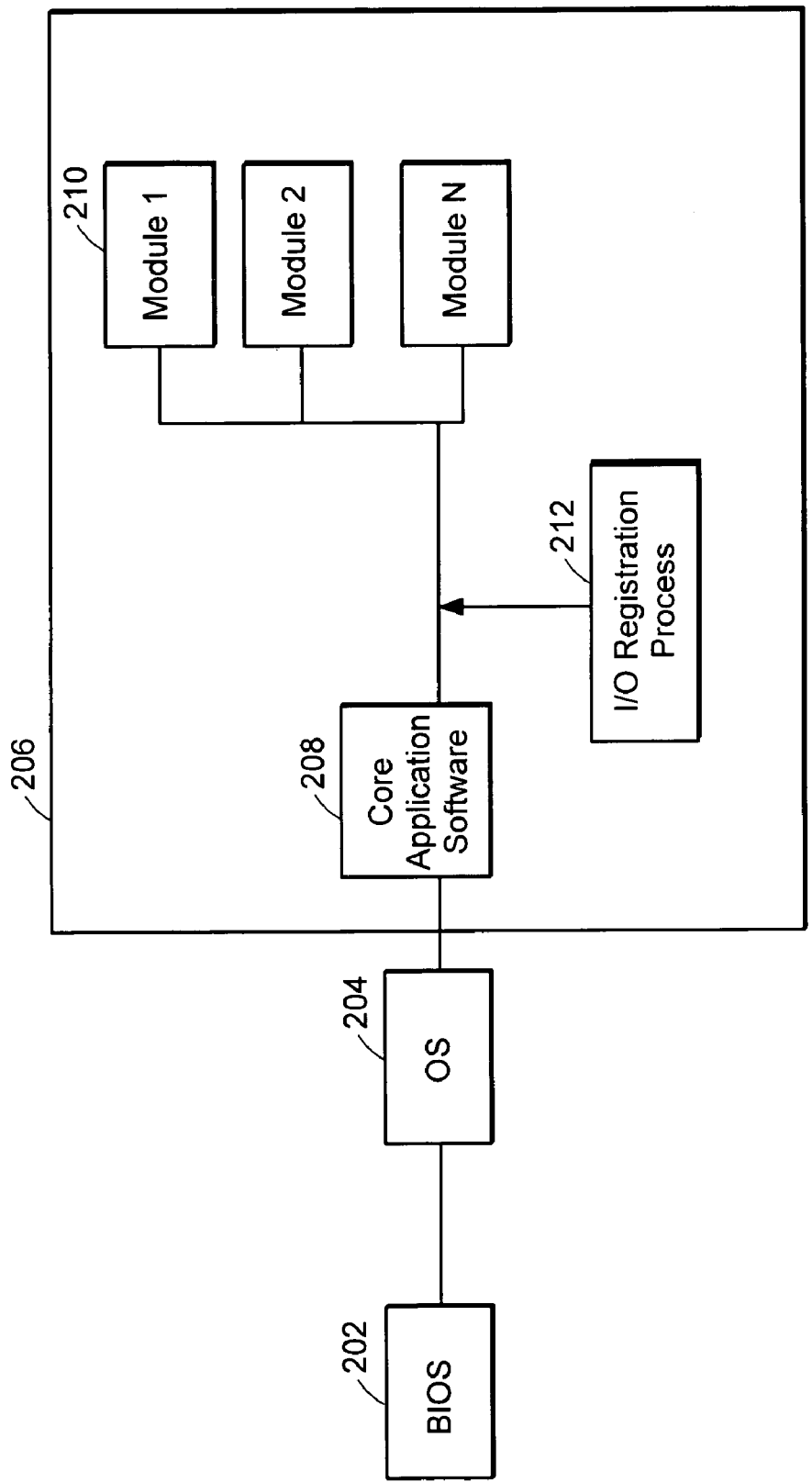
FIG. 3 is block diagram of application processes at the gateway server.

As illustrated in FIG. 3, the gateway server runs software that includes BIOS 202, operating system 204 and an application 206 which consists of a core 208 and any combination of one or more modules 210. The determination of which module to include in the application 206 is made through a registration process 212.

Figure 4:
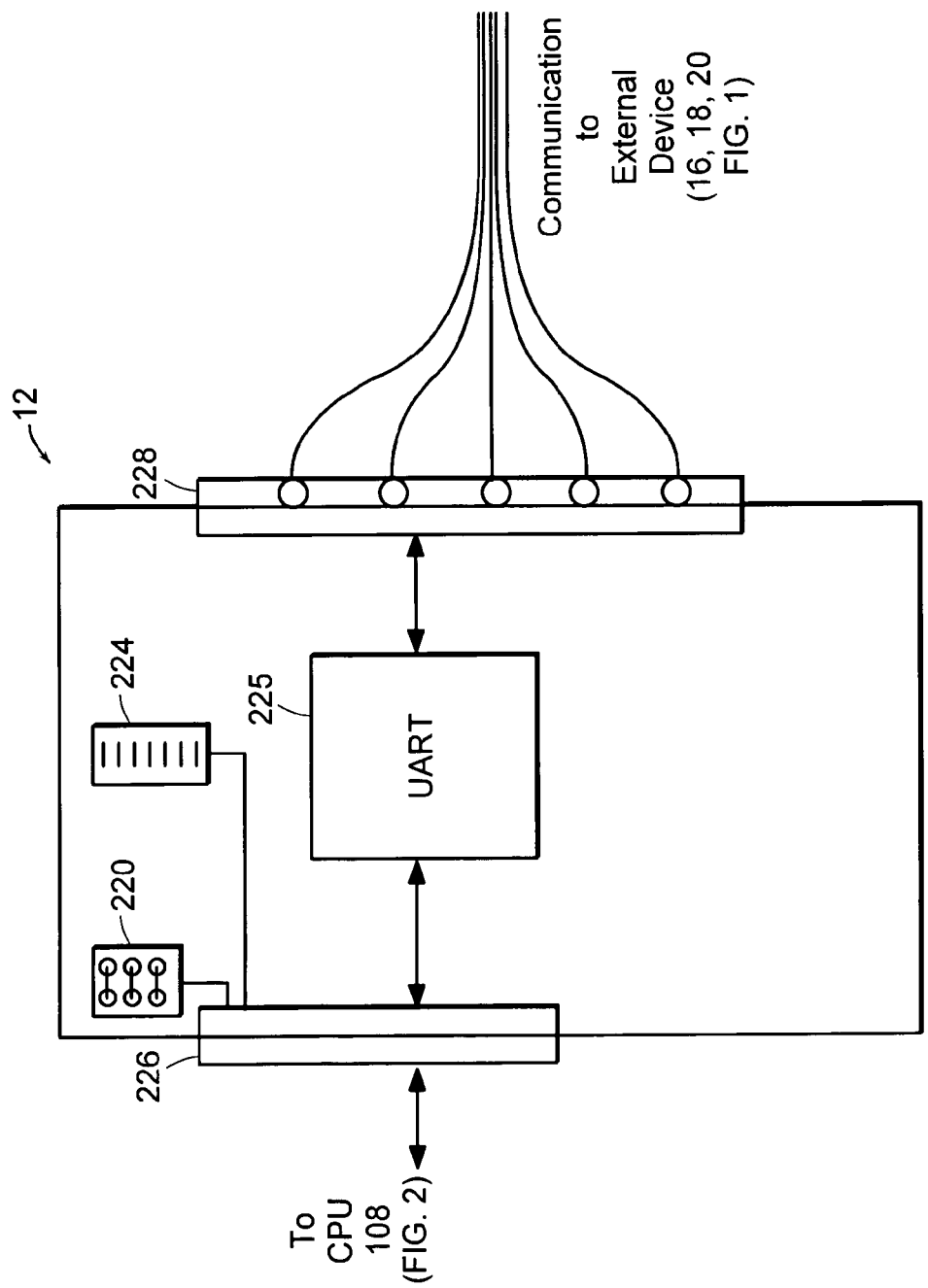
FIG. 4 is a diagram illustrating an I/O circuit card.

Referring now to FIG. 4, there is shown an I/O card 12 that includes UART 225, parallel interface connector 226 that connects to CPU 108 (FIG. 2) and serial interface connector 228 that connects to TPDs 16, 18, 20 (FIG. 1). The UART 225 provides conversion between serial and parallel data. The I/O card includes a hardwired set of jumpers 220 which identify the I/O card and an eight bit switch 224 which identifies the device to which the I/O card is connected via connector 228. It should be understood that other embodiments of the I/O card may employ a radio frequency data link for connecting between the server 10 (FIG. 1) and the external devices 16, 18, 20 (FIG. 1).

Referring again to FIG. 3, each of the eight I/O ports 12 (FIG. 2) is mapped to a 1000 byte address space in the memory space of CPU 108. The lower two bytes hold an identification number which identifies the hardware card which is installed in the I/O port and the device to which it is connected. The registration process 212 reads a byte or bytes from each address space assigned to I/O card and loads the corresponding software module 210 specific to that identification number. The core 208 initializes the module 210 to read data from the address space in which the identification number was read. Thus, through the registration process 212 a specific module 210 is loaded into the core application 206 and instructed as to the I/O port address from which to read its data.

The module 210 operates to either poll the device 16, 18, 20 (FIG. 1) to which it is dedicated in order to get the information it needs using the communications protocols specific to the external device, or to listen to the connected device 16, 18, 20 (FIG. 1) and extract the data it needs using the communications protocols specific to the external device. These protocols are either proprietary to the device or are commonly available from the device manufacturer. The resulting monitoring data is either saved or processed locally at the gateway server 10 (FIG. 2). Saved data is stored in a text file using a data record structure described further herein. For some types of TPDs and/or types of monitoring data, rather than storing the collected data directly to a text file, the collected data may be processed locally at the gateway server, for a multiple of reasons including but not limited to detecting and forwarding alarms, and delivery reconciliation. Internal processing includes parsing the device native data record to extract the specific data item that may be of interest at the server, e.g., an alarm indication.

Referring again to FIG. 1, the gateway server 10 processes the monitoring data collected from the various devices 16, 18, 20 into a common data format. In particular, a data record structure is defined such that native data records from the various TPDs can coexist in a text data file originating from a subscriber system. The text data file may be transmitted to the host 24 by any of the following means: 1) the poller 40 calls the subscriber system over standard phone lines 41; 2) the subscriber system calls the host over standard phone lines 38; or 3) the subscriber system sends data over the internet 42 or other suitable communication means.

At the host 24, parser 28 employs parsing routines that can properly identify the source and format of data and assign TPD specific parsing functions to the record such that the data in the record is properly placed in the appropriate databases 30. Without this common format, it would be impossible for the host computer to distinguish one manufacturer's data records form another where the possibility of more than one vendor having a common layout may exist. This methodology also allows manufacturers' data records which may differ between versions to be adequately distinguished. This methodology is accomplished by defining a common record layout as follows:

<SOR><Device ID><Job ID><Native Data><EOR>

Where
 SOR=Start of Record and is Control-A (0x01h)
 Device ID=Device Identification Code—8 character
 Job ID=Job Identification Number—2 character
 Native Data=data—variable length
 EOR=End of Record, Control-C (0x03h)

The Device ID field identifies the specific device which created the data in the "data" field and thus provides a key to understanding how that data should be separated into specific data elements. A sample device identification code list for use with an typical devices in an underground storage tank system is listed in Table 1:

TABLE 1

Sample Device Identification Code list

| Code | Description |
| --- | --- |
| 00112501 | Veeder Root - TLS250 Version 1 |
| 00113501 | Veeder Root - TL350 |
| 00113502 | Veeder Root - TL350R |
| 00121000 | Emco Wheaton - EECO 1000 |
| 00121500 | Emco Wheaton - EECO 1500 |
| 00122001 | Emco Wheaton - EECO 2000 Version 1 |
| 00132000 | Omntec OLE 2000 |

The Job ID field identifies the job or task from which the record originated, allowing the same data to be used by the host for different application requirements. The Native Data field can either contain the original characters as returned by the TPD or will be slightly modified from the original form. In either case, the intent is to leave the original string of characters intact.

To build such a record from a native record, the following process is employed:
1) Strip the leading Start-of-Header character from the native record if on exists.
2) Strip the trailing End-of-Record character from the native record if one exists.
3) Prepend a string of the following format:
 Character 0=0x01h
 character 1-8=
 character 9=job id (0 to 9)
4) Append a 0x03h character.

For example, if a TPD returns the following string:

<SOH><1234567890abcdefg><ETX> it would be reformatted as follows:

<SOR><Device ID><Job ID><1234567890abcdefg><EOR>

Multiple such records are saved in a text file on the server 10 to form a data file.

In other embodiments, the data record structure can be licensed to third party developers for incorporation into their devices thereby enabling the developer to integrate the device with one or more applications on the host 24.

The foregoing described the data record structure for encapsulating native data received from monitoring devices into a common format to send to the host. The same or similar data record structure can be used to format queries or commands from either the host or the gateway server towards the monitoring devices. For example, the Native Data field can be used to carry a native device command or query. In response, the data from such queried device can be returned in the aforementioned data record structure.

Figure 5:
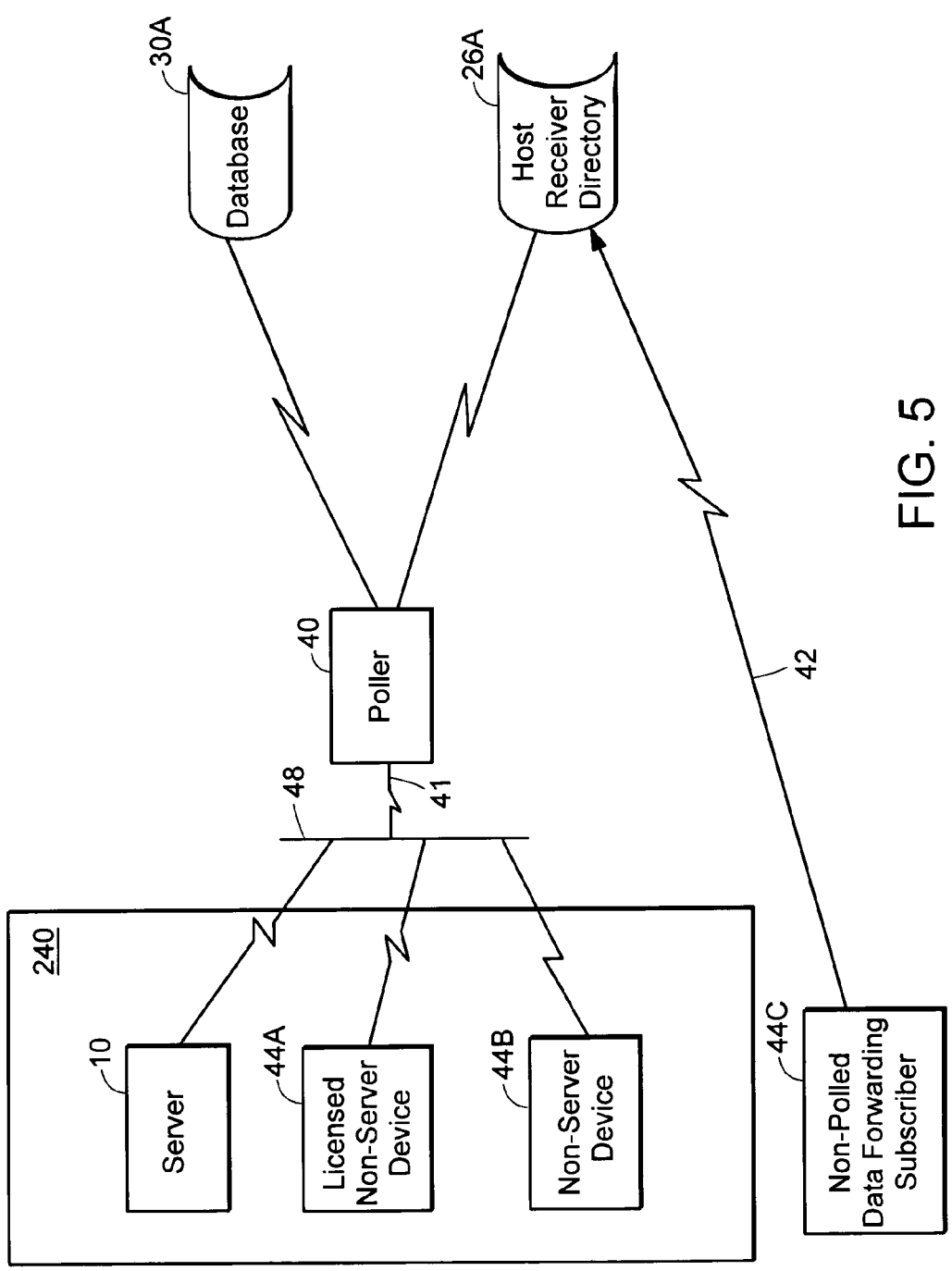
FIG. 5 is a block diagram illustrating a poller.

Referring now to FIG. 5, operation of the poller 40 is shown. The poller 40 may be a standard network-ready computer configured with hardware (consisting of an ethernet card and one or more modems) and software to extract the text data file from polled systems 240 via a dialup telephone connection 41. The polled systems 240 include the gateway server 10, non-server devices 44A which have licensed the record layout protocol described herein above and from non-server devices 44B which utilize different record layout protocols. The poller 40 operates by querying the host database 30A for a list of sites to poll together with the polling parameters, including but not limited to: baud rate, parity, stop bits, phone number, device identification number, task number and time to call. The poller 40 identifies the specific command or commands to issue to the polled system 240 by the task number and device identification number. Data returned to the poller as a result of issuing the polling command to the polled system is formatted according to the data record structure described above with a prepended "polling record" added to the file which identifies the source of the record. Periodically, the poller 40 may forward the saved data files to the host "receiver" directory 26A.

Other devices 44C that are subscribed to the services of the host may forward data directly to the host over the internet 42 without being polled by the poller 40.

Figure 6:
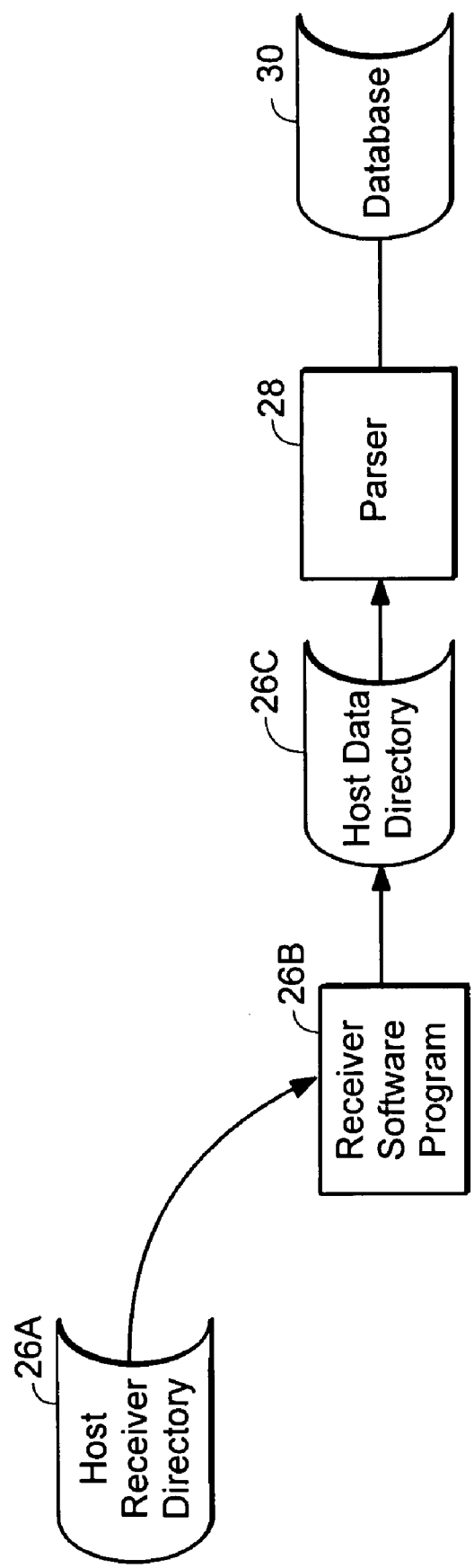
FIG. 6 is a block diagram illustrating a host receiver.

The host 24 (FIG. 1) generally includes several software applications. In an embodiment, the host system includes general purpose computer hardware and software. As noted above, the host includes a receiver 26, parser 28, databases 30, auditor 32 and web server 34 (FIG. 1). FIG. 6 illustrates processing flow of data by the receiver 26 and parser 28. In particular, data files collected by the poller 40 (FIG. 1) are copied to the host receiver directory 26A. Periodically, a receiver software program 26B gets a list of data files from the receiver directory and reads the polling record from each record. During this process, the file is validated against a database of known locations. If valid, the file is moved to the host data directory 26C.

The parser 28 periodically reads a list of files from the host data directory 26C, and parses each one using the record layout protocol described above to identify the parsing routines that may be applicable to each record. The parsing software routines are written using published or licensed specifications describing the layout and characteristics of data items within the record. The parser distributes the data elements of the data record to device specific databases.

The host provides an exception management process whereby rules are defined, against which performance of a resource under monitoring may be monitored. The exception management process defines conditions which may generate a message on a report or some other media advising that the defined condition has been met or exceeded. The rules may be derived from local, state or federal environmental requirements. For example, the rules may relate to local, state and federal regulations for underground storage tanks. In other embodiments, the rules may also include private or internally defined performance requirements.

For the exception management methodology, there are several aspects that include classifying systems and resources, cataloging rules, mneumonic naming, defining exception parameters and exception tables.

Infrastructures, structures, systems or entities which can be identified as having some fixed characteristics are divided into clearly defined systems. For example, an infrastructure consisting of underground storage tanks, piping, and pumps represents an Underground Storage Tank System, an infrastructure designed to process municipal wastewater represents a Wastewater System, an infrastructure designed to control indoor air temperature, circulation and humidity represents an HVAC System. In the embodiment described herein, each "system" is assigned an alpha-numeric number. Table 2 illustrates a sample list of infrastructures and their "system numbers":

TABLE 2

Sample System Number List

| | |
|---|---|
| 1001 | Underground Storage Tank Systems |
| 1051 | Waste Water Treatment Systems |
| 1101 | Energy Management Systems |
| 1151 | Refrigeration |
| 1201 | HVAC Systems |
| 1251 | Fuel Management Systems |

As described herein above, the term "resource" is used to represent individual elements or components of the systems being monitored. For example, an Underground Storage Tank System may include underground tanks, underground piping, groundwater sensors, dispenser sensors, a console or "tank gauge". In the embodiment described herein, each resource is assigned a "resource number". Resource numbers are system specific.

Regulations usually apply to a specific "system". Generally, the regulations set specific performance or operating conditions on these systems. These conditions are referred to herein as parameters. The general test can be understood as "if you have X, then you must meet requirement Y".

In Table 3, a sample set of mneumonics are disclosed which are used to build names which characterize elements of "systems". Mneumonics may be linked together to form a mneumonic string which generally represents or describes the "system".

TABLE 3

Sample Mneumonics

| | |
|---|---|
| AnodeCP | The cathodic protection system is an anode type |
| ATG | An Automatic Tank Gauge is present or required |
| DW | Tank is double wall |
| European | Suction system is of European design |
| Exempt Lines | Tank is classified under prevailing regulations as exempt |
| MonthlyIC | Monthly Inventory Control is required |
| Pressure | Pipe line is under pressure |
| SIR | Statistical Inventory Reconciliation |
| Suction | Pipe line is suction type |
| SW | Tank is single wall |
| TankE | Tank is an existing tank as defined in the regulations |
| XCP | No cathodic protection system installed |
| XEuropean | Suction system is not of European design |
| XMetallic | Material is non-metallic |
| XSIR | Statistical Inventory Reconciliation not present |

A parameter represents a condition which is being monitored for compliance to a threshold. A set of parameters is created for each "system" and are generally considered to be "system" specific. Table 4 is a sample list of parameters which apply to underground storage tank regulations. Each parameter is assigned a parameter number and a parameter description. Each parameter is also assigned a resource number which identifies the resource type to which the parameter may be associated. Each parameter is also assigned a unit of measure which gives the units of the threshold level which will be assigned later. Each parameter is assigned a sourcing code which indicates whether the data to be evaluated by the parameter is originating automatically or manually. For exception tables that are used for other environmental systems or other systems, a different set of parameters may be developed specific to that system.

TABLE 4

Sample Parameters for System 1001

| Code | Group | Description | Res. Group | Unit Measure | Renew Flag |
|---|---|---|---|---|---|
| 001 | 2 | Permit to Operate | 51 | Years | 1 |
| 002 | 2 | Automatic Tank Gauge Test | 51 | Years | 1 |
| 005 | 2 | Stage I/II Certificate of Compliance | 51 | Years | 1 |
| 006 | 2 | Cert. Inventory Reconciliation | 51 | Years | 1 |
| 010 | 0 | Records - On Site Lifetime | 51 | Years | 0 |
| 011 | 0 | Records - Retention Lifetime | 51 | Years | 0 |
| 100 | 2 | Tank Tightness Test - Initial | 52 | Months | 0 |
| 101 | 2 | Tank Tightness Test - Schedule | 52 | Months | 1 |
| 110 | 1 | Monthly Leak Test Rate | 52 | GPH | 0 |
| 111 | 1 | Monthly Leak Test Duration | 52 | Hours | 0 |
| 112 | 1 | Monthly Leak Test Schedule | 52 | Days | 0 |
| 113 | 1 | Monthly Leak Test Passing | 52 | Count | 0 |
| 120 | 1 | Annual Leak Test Rate | 52 | GPH | 0 |
| 121 | 1 | Annual Leak Test Duration | 52 | Hours | 0 |
| 122 | 1 | Annual Leak Test Schedule | 52 | Days | 0 |
| 150 | 1 | Continuous Leak Test (CLD) | 52 | | 0 |
| 160 | 2 | SIR - Monthly | 52 | Months | 0 |
| 161 | 2 | SIR - Annual | 52 | Years | 0 |
| 175 | 1 | Overfill Alarm - (90%) | 52 | | 0 |
| 176 | 1 | Overfill Alarm - (95%) | 52 | | 0 |
| 300 | 0 | Daily Reconciliation | 52 | | 0 |
| 315 | 1 | Reconciliation (MA) | 52 | Gallons | 0 |
| 316 | 1 | Reconciliation (40 CFR 280) | 52 | Gallons | 0 |
| 317 | 1 | Reconciliation (Ct) | 52 | Gallons | 0 |
| 318 | 1 | Reconciliation (NY) | 52 | Gallons | 0 |
| 319 | 1 | Reconciliation (1%%) | 52 | Gallons | 0 |
| 400 | 1 | Water - Monthly Measurement | 52 | | 0 |
| 401 | 1 | Water - Max. Height | 52 | Inches | 0 |
| 402 | 1 | Water - 24 hr Gain | 52 | Inches | 0 |
| 403 | 1 | Water - Periodic Gain | 52 | Inches | 0 |
| 405 | 1 | Water - 30 Day Gain | 52 | Inches | 0 |
| 406 | 1 | Water - Recurring Rise | 52 | | 0 |
| 440 | 1 | Track Use Days | 52 | Days | 0 |
| 450 | 1 | Book Loss - Days Allowed | 52 | Days | 0 |
| 460 | 1 | Count Days with Book Loss | 52 | | 0 |
| 500 | 1 | Line Leak Tests | 52 | Years | 0 |
| 501 | 2 | Line Sump Sensor - Test | 53 | Years | 0 |
| 502 | 2 | Line Sump Sensor - Continuous | 53 | | 0 |
| 503 | 2 | Mechanical LLD - Test | 54 | Years | 0 |
| 504 | 1 | Automatic LLD Test Results | 51 | Months | 0 |
| 505 | 2 | Line Test - Initial | 54 | Months | 0 |
| 506 | 2 | Line Test - Schedule | 54 | Years | 1 |
| 601 | 1 | TankIS Sensor - Test | 52 | Years | 0 |
| 602 | 2 | TankIS Sensor - Continuous | 53 | | 0 |
| 704 | 0 | Records Lifetime | 52 | Years | 0 |
| 801 | 2 | Cathodic System Tests | 51 | Years | 0 |
| 802 | 2 | Cathodic System Inspection | 51 | Months | 0 |
| 803 | 2 | Anode Test | 51 | Years | 0 |
| 804 | 2 | Anode Inspections | 51 | Years | 0 |
| 810 | 2 | Observ. Well Periodic Test/Insp. | 51 | Years | 0 |

The exception management methodology is built around "exception tables". Exception tables are "system" specific and consist of a set of parameters with each parameter having a threshold assigned. The exception table defines a set of rules or parameters which represent the operating requirements of the "system". Each exception table that is created is assigned a "system" number, a resource number, a reference number and a name. The "system" number restricts the use of the table to the system so assigned. The "resource" number further restricts the use of the table to the resource so assigned. The reference number may be any combination of numbers and characters. For example: "MA793" may be the reference number for an exception table. The exception table title is a string made up from mneumonics established for the "system" which provide a meaningful description of the table. For example: "NewUST-XSteel-XCP-XSir" may be the name of an exception table. In this example, the following mneumonics are used to describe the table and how or what it is to be applied to:

NewUST
   This table is for new underground storage tanks.
XSteel
   This tank is not steel
XCP
   This tank has no cathodic protection
XSir
   This tank is not using SIR.

Table 5 is a sample exception table listing:

TABLE 5

Sample Exception Table
MA793 - NewUST-XStell-XCP-XSir

| Parameter | Threshold | Units |
|---|---|---|
| 316 | blank | blank |
| 110 | .1 | GPH |
| 111 | 2 | Hours |
| 112 | 30 | Days |
| 113 | 1 | none |

Once an exception table has been created, parameters may be assigned to it. The parameters which are assigned to an exception must be parameters which are assigned to the same "system" and "resource" as the exception table itself. During this assignment of parameters to a table, a threshold value is assigned to the parameter. The parameter threshold identifies the threshold or trigger point for the "exception parameter" to be reported as an exception or out-of-bounds condition. For example, parameter 1234 may represent "High Temperature" and have a threshold of 48. Since parameter 1234 has a unit of measure of "degrees", 48 represents 48 degrees. If the monitored resource reaches a temperature of 48 degrees or more, an exception condition is reported.

Figure 7:
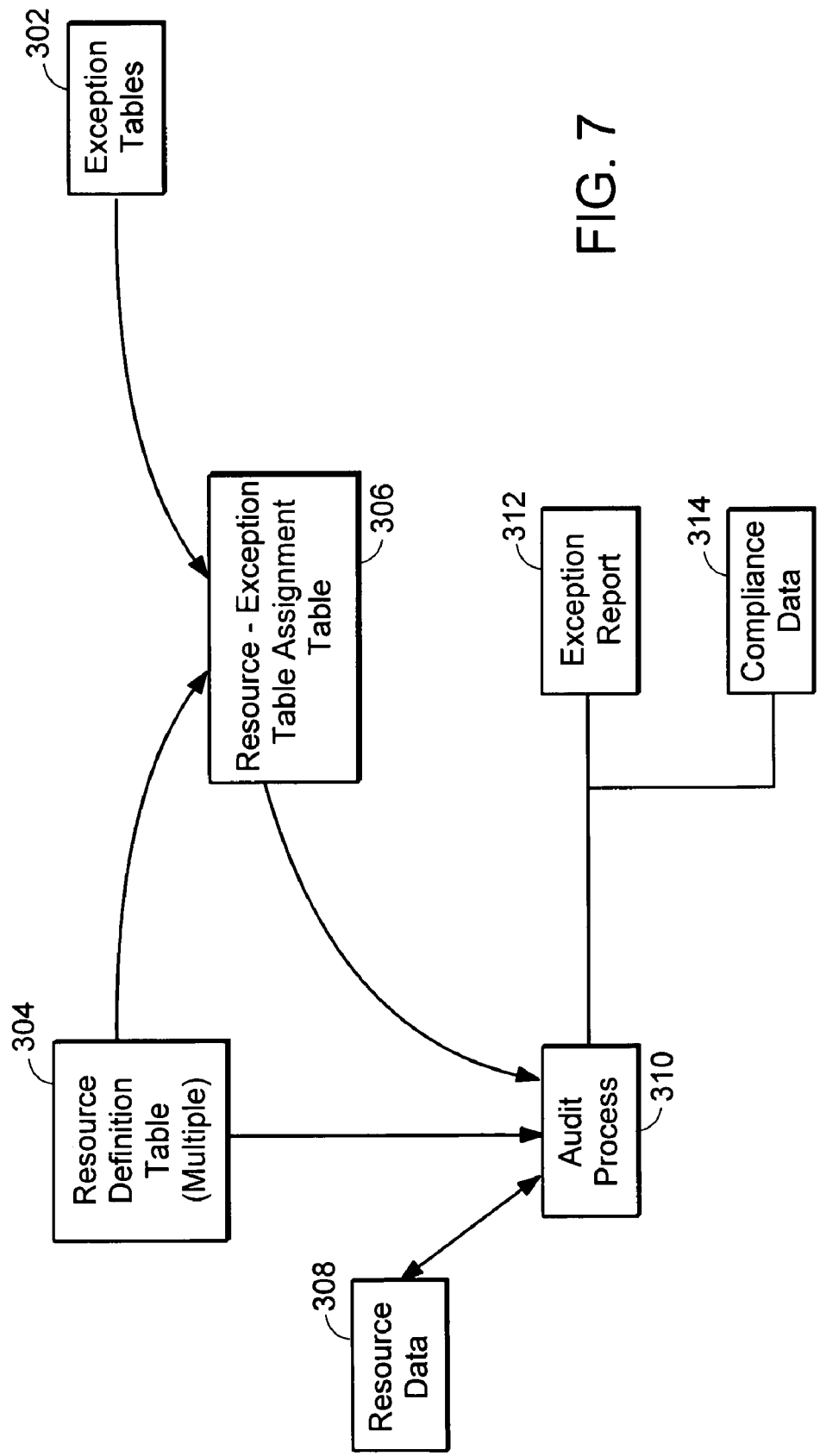
FIG. 7 illustrates audit processing with exception tables.

Once a table has been made it may be "assigned" to a specific component or element of the "system". This is accomplished by relating, in data, an exception table to a data record representative of the resource or system component. FIG. 7 illustrates this relationship where data table 304 represents "system resources", data table 302 represents a set of established/created "system" exception tables, and data table 306 represents linking a specific resource definition record to a specific exception table. Note that a "system" may have multiple exception tables.

A sample system configuration record is shown in Table 6:

TABLE 6

Sample Configuration Record

System Configuration Record:

| | |
|---|---|
| Number of Sensors = | 6 |
| Number of Tanks = | 3 |
| Line Leak Detection = | yes |
| Install Date = | 2001-01-13 |
| Continuous Leak Detection = | yes |

Tank Configuration Record:

| | |
|---|---|
| Resource ID = | 124789 |
| Tank Number = | 01 |
| Size = | 8050 |
| Install Date = | 2001-01-13 |

Sensor Configuration Record:

| | |
|---|---|
| Resource ID = | 127431 |
| Sensor Number = | 01 |
| Name = | Regular Sump |

A sample data table representing linking a specific resource definition record to a specific exception table is shown in Table 7:

TABLE 7

Resource Exception Table Assignment Table

| Resource ID | Exception Table ID |
|---|---|
| 124789 | NH01 |
| 127012 | NH02 |
| 123471 | NH37 |
| 125462 | NH01 |
| 127012 | NH47 |

As noted, the exception tables are used to audit a "resource". FIG. 7 shows the flow for the auditing. The audit process 310 is a software program which reads in all parameters from all exception tables associated with a specific "system" and its "resources". Each parameter is evaluated using a parameter specific software function in the audit software program to read parameter specific data from the host system database 308. The parameter specific function evaluates the data using the threshold assigned to the parameter in the exception table and determines a pass or fail state. The resulting pass or fail condition is posted to an exception reporting table 312 and/or a compliance data table 314.

Figure 8:
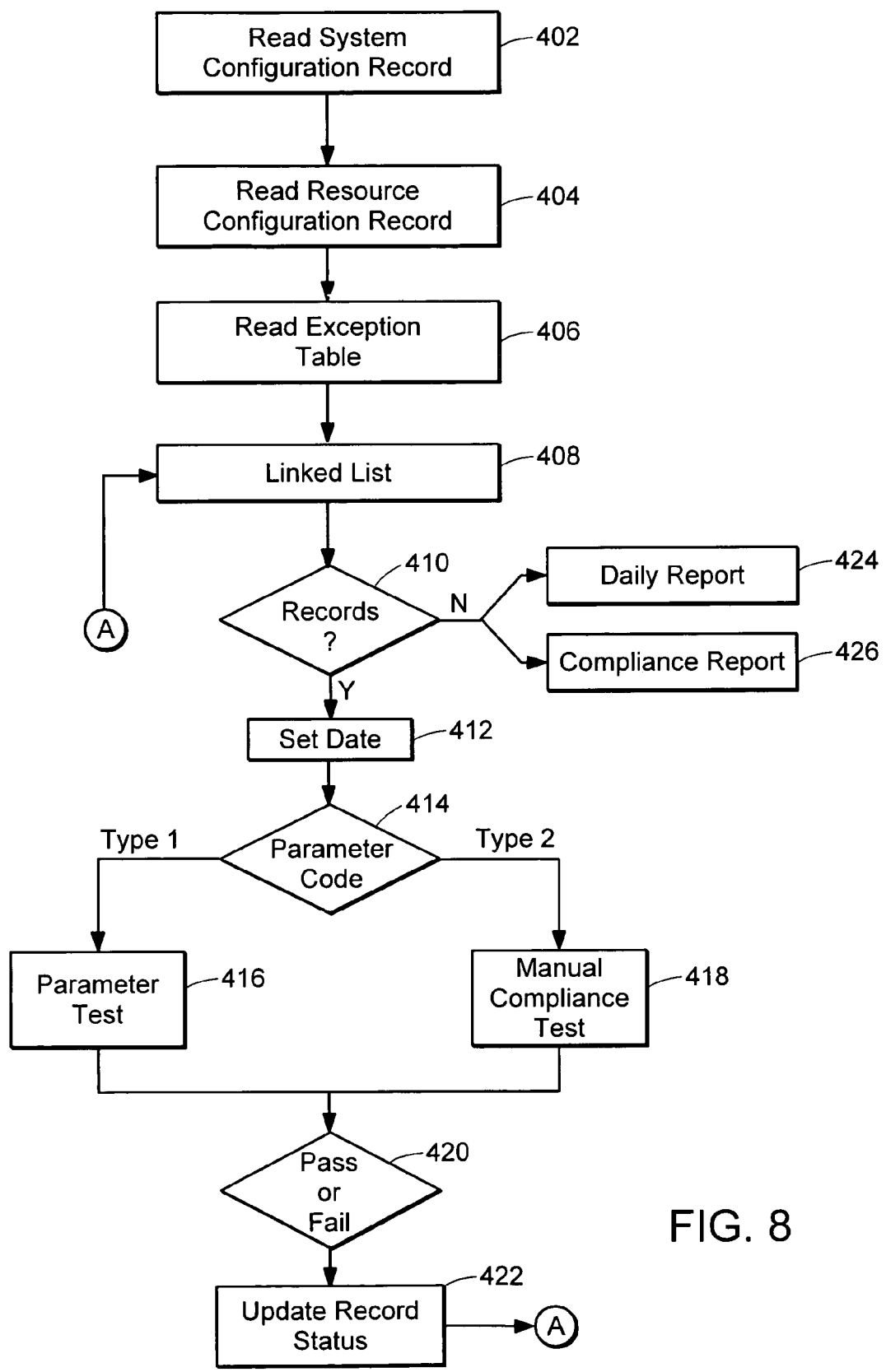
FIG. 8 is a flow diagram illustrating audit processing.

The audit program is now described in further detail. FIG. 8 illustrates a process flow diagram. Reference is also made to FIG. 7. The audit program may be run as a background process on the host computer 24 (FIG. 1). Generally, the process reads one or more records from a table which contains one or more records identifying a system at a location to audit and a period of time within which to audit.

At 402 a system configuration record 304 is read into memory at the host. At 404 one or more resource configuration records 304 are read for resource types indicated in the system configuration record as being present. At 406 one or more exception tables 302 are read from a table 306 which lists each resource at a location and all exception tables assigned to that resource. Subsequent to this read, a linked list 408 will exist in memory with the following sample data structure:

```
typedef struct exception_table_struct
{
    char date[11];              // auditing period
    char table_code[6];         // exception table
    char table_type[2];
    char parameter_code[5];     // parameter code
    char parameter_desc[51];    // description of parameter
    char resource_type[3];      // code identifying the resource type
    char resource_id[10];       // unique resource id number (int)
    char threshold[10];         // limit used to determine pass/fail
    char unitom[11];            // unit of measure for threshold
    int renewable;              // For manual parameters only:
                                // 0=not renew after expires, 1=renew
    char status[2];             // 1=fail, 2=not fail(pass), 3=alert
    char result[35];            // for a short comment
    struct exception_table_struct *next;
}
```

Subsequently, each record in the linked list is processed according to the following flow. After checking at 410 whether there is a current record in the linked list to be processed, the date is set to the last day of the monthly period being audited at 412. Each record is processed in one of two possible forms depending on the value of parameter_code and the type of parameter represented by the parameter_code at 414.

If the parameter_code is a type 1 code then a function specific to the parameter_code is called at 416, for example:

```
if(parameter_code = "402")
    parameter_test_402( )
```

If the parameter_code is a type 2 code then a function to test for manual compliance to the item identified by this parameter_code is called at 418, for example:

```
if(parameter_code = "001")
    manual_compliance_test( )
```

If the parameter_code is a type 0 code then the record is skipped.

For type 1 parameters, a function specific to testing a given parameter is written. For example, parameter_code 402 defines a requirement that over a 24 hour period, water level in a tank cannot rise over the threshold set in the exception table where the parameter is used. Thus, a function is included in the audit program to test for water level changes over 24 hours in the tank resource under audit. There is one such function for each type 1 parameter. A pass or fail result is posted to the record status field at 420. A short comment may be posted to the record comment field.

For type 2 parameters, a general function to test parameters whose compliance to is satisfied with data input by the user is included in the audit program. A table of manual compliance records is queried to extract those records which pertain to the resource being audited and to the time period being audited. If no records are found, the function creates one for the current compliance period and sets the test result to fail at 422. If a record is found, a test is performed to determine if the user has satisfied the requirement by checking the date entered by the user into the manual compliance record to determine whether the date is before the due date for the parameter as set in the manual compliance record. If so, the test result is a pass, if not the test result is a fail at 422.

The next record in the linked list 408 is processed. At the conclusion of the loop described above, each record in the linked list 408 will have been tested and updated with a pass or fail status and possibly a comment. Results of tests are posted to one of two tables for reporting. If the period under audit includes the date when the audit is being conducted, the results are posted to a daily exception table 424. If the period under audit is a period of time prior to the date when the audit is being conducted, results are posted to a compliance summary table 426.

If the period under audit includes the date when the audit is being conducted, alarm data is read into memory and saved in a linked list identical to that described. Only alarms which are identified as active in the alarm table are read in. All such records read into memory will have their pass/fail status set to fail. That is, the alarm audit does not include testing the data against exception tables. The results of the alarm audit are posted to a daily exception table.

Thus, the audit process is performed periodically on data originating from the subscribing systems. Each time the subscribing system sends new data to the host, the host analyzes the data using the exception table(s) which applies to each "resource" of the "system" being reviewed. Exception reports are created daily as a result of this process. Periodically, a management report or compliance report shows the status of compliance with the rules of an exception table. The audit process may be performed at intervals of time best suited for the data being analyzed. The preferred embodiment performs the audit process daily.

The audit process may also be performed on manually entered compliance data provided by the user through a user input such as a web form.

Figure 9:
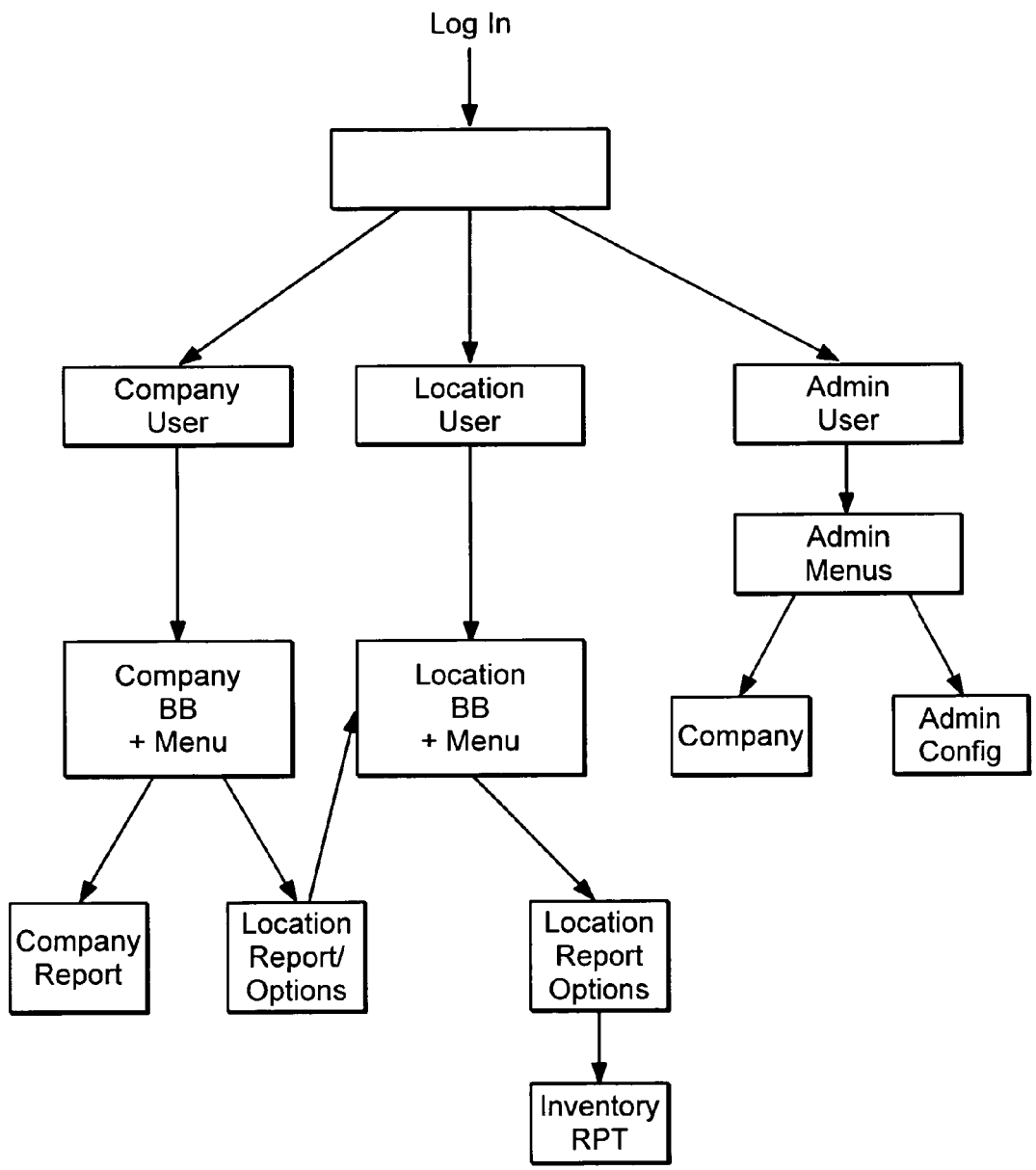
FIG. 9 is a diagram that illustrates a hierarchy for a user interface.

The user interface is now described. The user is provides with a web based interface to allow access to data, reports and configuration information for the monitored "systems". A hierarchical view of the user interface is shown in FIG. 9. Two aspects of the interface are provided, the first being a set of reports and entry forms which are used exclusively by an administrator for the purpose of managing users, configuring new and existing locations, and monitoring the process as a whole. Through the web based application the system administrator can manage users, configure users systems and monitor the application, create exception tables and exception parameters and manage an alarm definitions.

The second set is the end user interface which provides the end user with access to reports, graphs, and data entry forms, either from a company view or a location view or both. For example, for any parameter in any exception table for any resource of a system, the use can enter input which is inserted as a record into a table of manual compliance database table. The user usually enters information which indicates the manual compliance parameter has been satisfied or not and a text comment. Another form may be a delivery entry form, for example, which can be used to enter the number of gallons which were ordered for a specific delivery which has been recorded by a tank gauge device 16 (FIG. 1). The user can select a specific delivery to which the number of gallons ordered for that particular delivery is to be added.

Figure 10:
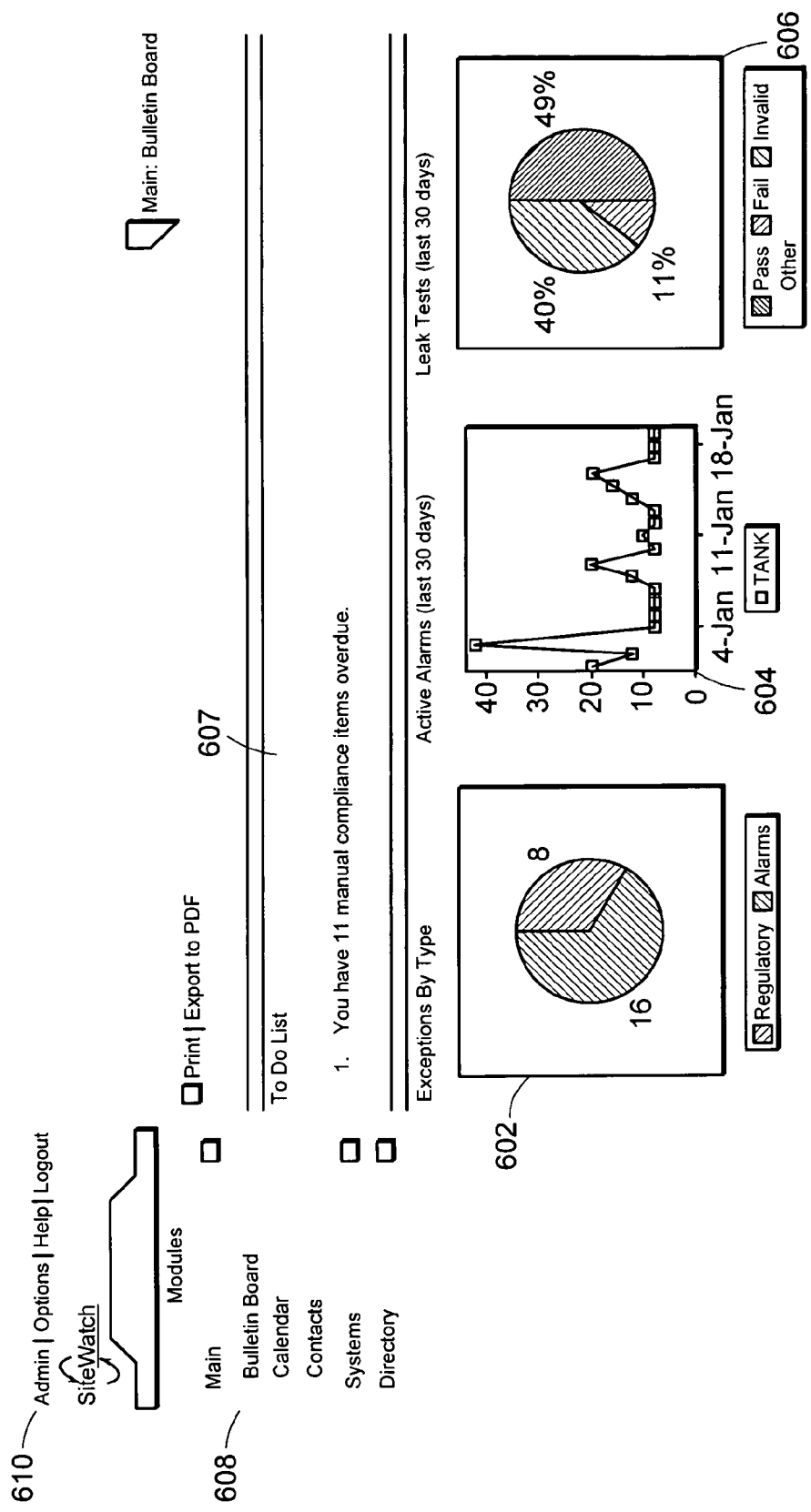
FIG. 10 is a screen view of a first sample view from the user interface.
Figure 11:
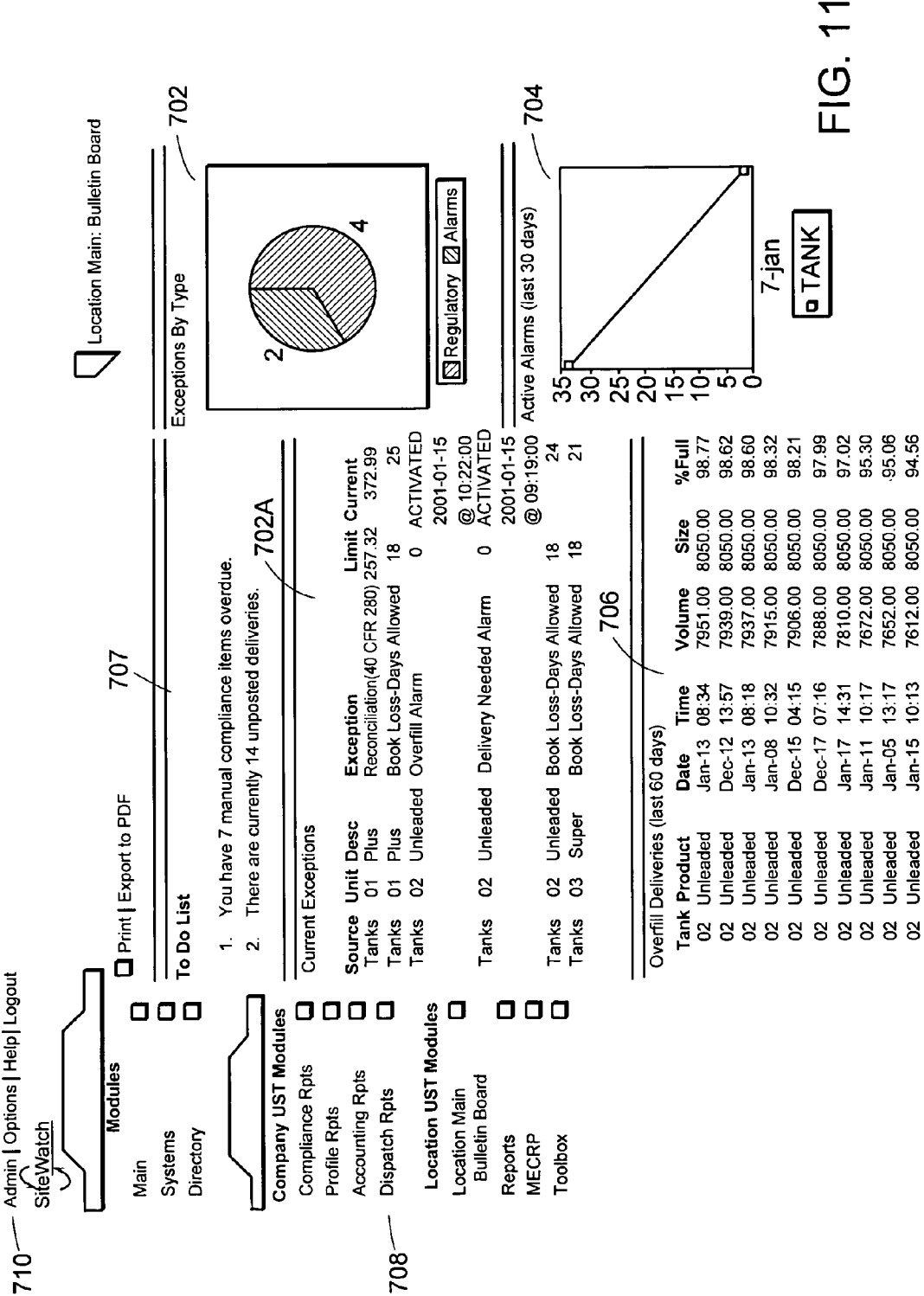
FIG. 11 is a screen view of a second sample view from the user interface.

Sample screens from the user interface are shown in FIGS. 10 through 12. It should be understood that the screens are exemplary and that other views and presentations of parsed and audited data are possible.

FIG. 10 illustrates a so-called bulletin board view available to the company user that displays graphical information relating to exceptions by type 602, active alarms 604 and leak tests 606. In addition to the information displayed, there is a to-do list section 607 and controls available through drop down menus 608 and tab controls 610.

FIG. 11 illustrates another bulletin board view available to the location user that displays graphical information relating to exceptions by type 702, current exceptions 702A, active alarms 704 and overfill deliveries 706. In addition, there is a to-do list section 707 and controls available through drop down menus 708 and tab controls 710. The view may also include leak tests (not shown).

FIG. 12 illustrates an inventory report available through the location user interface. The view includes inventory information 802 in tabular format and controls 804 and 806.

It should be understood that other embodiments may include additional systems, resources, and exception tables to provide a robust platform upon which a variety of facility, site and device management services can be implemented. For example, additional I/O modules may be provided to meet the needs of new third party devices and communications protocols allowing additional host services to be offered with minimal delay. Further, with the open architecture as described for the embodiments herein, new host applications can easily be incorporated to accommodate new management and reporting needs of new devices or systems.

The regulatory database captured in the form of the exception tables can be made accessible to third party users or developers under a license. Similarly, the communications protocols may be licensed out to third party users such that they could forward data, via the common data record structure, to the host.

An example to illustrate the principles of the present approach assumes a convenience store that has the following TPDs installed: 1) Energy Management System (EMS) which monitors and controls heating and lighting at the store; 2) Gasoline dispensing system from which customers purchase and pump their own gasoline and which is controlled via a controller; and 3) Underground storage tank monitor system which provides information on the status of gasoline inventories in underground tanks and the status of sensors around the tanks.

The gateway server 10 (FIG. 1) serving this site will have three hardware I/O cards 12 and three software modules 210 (FIG. 3). The EMS may provide an interface such as an RS232 serial port to which others may connect for the purpose of integration. The I/O card used to interconnect with the EMS may be an RS232 type. In an embodiment, RS232 I/O cards are assigned a Module Identification Number of 14 (corresponding to element 220 FIG. 4). The EMS from this particular vendor has a Device Identification Number of 87 (corresponding to element 224 FIG. 4). The software module for this EMS is customized to read the manufacturers data structures and include tasks and a user interface appropriate to the device. Upon turning on the gateway server, the server software 208, 212 (FIG. 3) reads the Device Code of 87 from the I/O card and looks for a software module with the same number. When found, that module will be bound to the address space at which the Device Code was read. In this case, the one RS232 I/O card is bound to the EMS at one address space, one I/O card to the dispenser system at a second address space and one I/O card to the tank gauge at a third address space.

Once this initialization step is completed for all I/O cards, each module operates independently. Module tasks run at their defined times performing their defined jobs.

One task that each module has is to collect and save certain data from the TPD to which it is connected. For example, one task of the tank gauge software module may be to collect inventory from each tank and save the data to a file. In doing so, the software module queries the tank gauge with the commands specified by the manufacturer of the device, reformats the data returned from the TPD to comply with the format identified above, and saves the reformatted record to a file.

At some user set time, the communications module 14 (FIG. 1) transmits the file to the host, or the host may issue a request to the gateway server to transmit its file.

While this invention has been particularly shown and described with references to preferred embodiments thereof, it will be understood by those skilled in the art that various changes in form and details may be made therein without departing from the scope of the invention encompassed by the appended claims.

What is claimed is:

1. A monitoring management system comprising:
a plurality of devices, each device providing monitoring data associated with monitoring of a corresponding resource, the monitoring data for each particular device represented in a data format specific to that device;
a gateway server having a plurality of device ports, each device port connected to a corresponding device for receiving the monitoring data, a processor for processing the received data into a common format from the device-specific formats, wherein the common format defines a data record structure that includes a device identifier field for identifying the specific device and a native data field for carrying the monitoring data, and a communication port for communicating the processed data;
a host connected to the gateway server communication port having a receiver for receiving the communicated data, a parser for parsing the received data, an auditor for auditing the parsed data;
wherein the host further includes one or more exception tables that define rules for testing for out of limit conditions associated with monitored resources and wherein the auditor provides auditing by evaluating the parsed data based on one or more rules defined by one or more entries of the exception tables to provide one or more exception reports based on an outcome of the audit.

2. The monitoring management system of claim 1 wherein the monitoring data carried in the native data field is in the device-specific format.

3. The monitoring management system of claim 1 wherein the monitoring data carried in the native data field is modified from the device-specific format.

4. The monitoring management system of claim 1 wherein the processed monitoring data in the common format comprises plural data records that is communicated to the host as data file.

5. The monitoring management system of claim 1 wherein the parser parses the received data based on the device identifier field and native data identifiers contained within the native data field and stores the parsed data in device-specific databases.

6. The monitoring management system of claim 1 wherein the one or more exception reports are any of a type that includes daily, periodic and manual compliance reports.

7. The monitoring management system of claim 1 wherein the exception tables are based on regulations of a type that includes local, county, state, federal and other regulatory entities.

8. The monitoring management system of claim 1 wherein the exception tables are based on non-regulatory rules of a type that includes corporate policy and industry standards.

9. The monitoring management system of claim 1 wherein the monitoring data includes alarm data that the auditor audits to provide one or more exception reports.

10. The monitoring management system of claim 1 wherein the plurality of devices includes more than one type of device.

11. The monitoring management system of claim 10 wherein the more one than one device type includes RS232, RS485, FireWire, Current Loop, and Ethernet.

12. The monitoring management system of claim 1 wherein the gateway server further includes plural device-specific software modules, each module associated with a corresponding device port for handling processing of data through the device port.

13. The monitoring management system of claim 12 wherein the gateway server processor is adapted to identify the type of device port and load the corresponding device-specific software module into a processor memory.

14. The monitoring management system of claim 1 wherein the host is connected to the gateway server over a communications network.

15. The monitoring management system of claim 14 wherein the communications network includes a data network.

16. The monitoring management system of claim 14 wherein the communications network includes a public switched telephone network.

17. The monitoring management system of claim 1 further comprising a data source that communicates other monitoring data in the common format to the host wherein the parser parses the received other monitoring data and the auditor audits the parsed other monitoring data.

18. The monitoring management system of claim 17 wherein the other monitoring data includes alarm data that the auditor audits to provide one or more exception reports.

19. The monitoring management system of claim 1 wherein the host further includes a user interface application that provides access to audited data.

20. The monitoring management system of claim 19 wherein the devices are associated with monitoring multiple systems at multiple locations, and wherein the user interface application provides access to data from multiple systems and multiple locations.

21. A host comprising:
a receiver for receiving monitoring data in a common format, the monitoring data associated with monitoring of resources by corresponding monitoring devices, the monitoring data for each particular device represented in a data format specific to that device, the common format defining a data record structure that includes a device identifier field for identifying the specific device and a native data field for carrying the monitoring data;
a parser for parsing the received data based on the device identifier field and native data identifiers contained within the native data field;
one or more exception tables that define rules for testing for out of limit conditions associated with monitored resources; and
an auditor for auditing the parsed data by evaluating the parsed data based on one or more rules defined by one or more entries of the exception tables to provide one or more exception reports based on an outcome of the audit.

22. The host of claim 21 wherein the monitoring data carried in the native data field is in the device-specific format.

23. The host of claim 21 wherein the monitoring data carried in the native data field is modified from the device-specific format.

24. The host of claim 21 wherein the monitoring data in the common format comprises plural data records that is communicated to the host as a data file.

25. The host of claim 21 wherein the one or more exception reports are any of a type that includes daily, periodic and manual compliance reports.

26. The host of claim 21 wherein the exception tables are based on regulations of a type that includes local, county, state, federal and other regulatory entities.

27. The host of claim 21 wherein the exception tables are based on non-regulatory rules of a type that includes corporate policy and industry standards.

28. The host of claim 21 wherein the monitoring data includes alarm data that the auditor audits to provide one or more exception reports.

29. The host of claim 21 wherein the received monitoring data includes other monitoring data in the common format from a data source, wherein the parser parses the received other monitoring data and the auditor audits the parsed other monitoring data.

30. A method of communicating at a host, the method comprising:

receiving monitoring data in a common format, the monitoring data associated with monitoring of resources by corresponding monitoring devices, the monitoring data for each particular device represented in a data format specific to that device, the common format defining a data record structure that includes a device identifier field for identifying the specific device and a native data field for carrying the monitoring data;

parsing the received data based on the device identifier field and native data identifiers contained within the native data field;

defining rules in one or more exception tables for testing for out of limit conditions associated with monitored resources; and auditing the parsed data by evaluating the parsed data based on one or more rules defined by one or more entries of the exception tables to provide one or more exception reports based on an outcome of the audit.

31. A host comprising:

a processor;

a memory;

means for receiving monitoring data in a common format, the monitoring data associated with monitoring of resources by corresponding monitoring devices, the monitoring data for each particular device represented in a data format specific to that device, the common format defining a data record structure that includes a device identifier field for identifying the specific device and a native data field for carrying the monitoring data;

means for parsing the received data based on the device identifier field and native data identifiers contained within the native data field;

means for defining rules in one or more exception tables for testing for out of limit conditions associated with monitored resources; and means for auditing the parsed data by evaluating the parsed data based on one or more rules defined by one or more entries of the exception tables to provide one or more exception reports based on an outcome of the audit.

* * * * *